United States Patent
Haran et al.

(10) Patent No.: US 7,787,888 B2
(45) Date of Patent: Aug. 31, 2010

(54) INTER-WORKING LOCATION GATEWAY FOR HETEROGENEOUS NETWORKS

(75) Inventors: Narayanan Haran, Hoffman Estates, IL (US); Narothum Saxena, Hoffman Estates, IL (US); Michael Irizarry, Algonquin, IL (US)

(73) Assignee: United States Cellular Corporation, Chicago, IL (US)

( * ) Notice: Subject to any disclaimer, the term of this patent is extended or adjusted under 35 U.S.C. 154(b) by 541 days.

(21) Appl. No.: 11/618,316

(22) Filed: Dec. 29, 2006

(65) Prior Publication Data
US 2008/0161012 A1      Jul. 3, 2008

(51) Int. Cl.
*H04W 24/00* (2009.01)
(52) U.S. Cl. .............. 455/456.1; 455/428; 455/435.1; 455/432.1; 455/433; 455/440; 455/435.2; 455/404.2; 370/331; 370/401; 370/349
(58) Field of Classification Search .............. 270/349; 455/456.1–458, 435.1–435.3, 432.1–433, 455/414.1–414.3, 404.1, 404.2, 428, 440; 370/349, 331, 401
See application file for complete search history.

(56) References Cited

U.S. PATENT DOCUMENTS

| 6,564,055 B1* | 5/2003 | Hronek .................. 455/433 |
| 2003/0125044 A1* | 7/2003 | Deloach et al. .......... 455/456 |
| 2005/0078652 A1* | 4/2005 | Rousseau et al. ......... 370/349 |
| 2006/0258371 A1* | 11/2006 | Krishnamurthi et al. .. 455/456.1 |
| 2007/0149213 A1* | 6/2007 | Lamba et al. .......... 455/456.1 |

* cited by examiner

*Primary Examiner*—Kamran Afshar
*Assistant Examiner*—Chuong A Ngo
(74) *Attorney, Agent, or Firm*—Leydig, Voit & Mayer, Ltd.

(57) ABSTRACT

A system and method are described for providing and using an inter-working location gateway (IWLG) that allows a trusted/non-trusted user plane mobile node to successfully utilize user location services while data roaming. In an embodiment, once the mobile node establishes a data connection while roaming, the mobile node uses IP connectivity to exchange messages, e.g., IS-801 messages, with an IWLG located in the home network. Via the messaging, the mobile node provides certain parameters which the IWLG uses to determine which network the mobile node is roaming. The IWLG interfaces with the appropriate network elements in the visited network to determine the location of the mobile node.

22 Claims, 4 Drawing Sheets

INTER-WORKING LOCATION GATEWAY FOR HETEROGENEOUS NETWORKS

FIELD OF THE INVENTION

This invention relates generally to the field of wireless communications and more specifically to the field of device location resolution.

BACKGROUND OF THE INVENTION

As mobile computing and communication devices become more prevalent, the need for additional services and functionality increases as well. For example, mobile communication devices such as cell phones were originally intended simply to allow a mobile user to communicate telephonically from remote locations without the need to locate a landline such as a pay phone. As cellular technology and devices increased in prevalence, users began to demand and receive additional services unique to the mobile environment. For example, many cellular communication devices are now used in a highly mobile environment where real-time location-based services are needed. Indeed, many vehicles now come equipped with cellular wireless telematics units, and the need for navigation assistance, weather data, traffic reports, and other location-based information has increased accordingly.

The provision of location-based information and services entails overcoming a number of challenges, but the first step in providing such services is the accurate identification of a mobile node's location.

Location detection and identification implementations are generally either control-plane applications or user-plane applications. Control plane applications use the network signaling capabilities, e.g., IS-41 signaling networks, as a means to detect the location of the mobile node. The "E911" service is an example of a well-known control plane application. Control plane location detections are typically network initiated.

In contrast, user plane implementations use the IP network and protocols rather than the signaling network for location data requests and transmission. Although all user plane implementations are IP-based, there are different possible user plane implementations with this group. For example, user plane implementations can operate according to either a "Trusted" or "Non-Trusted" model. The trusted model assumes that the location client/application are trusted, and thus no authentication of the client is required. In this model, there are no network initiated location requests. In contrast, the non-trusted model requires that the location requesting entity to be authenticated, thus allowing for both network initialed and mobile initiated location requests.

Both control and user plane implementations use a Base Station Almanac (BSA) lookup to provide an initial location determination. However, user plane implementations employ the system ID (SID, used to determine a home network from a roaming network), network ID (NID), BASEID and PN-OFFSET as keys for the BSA lookup operation. In contrast, the control plane implementations use the Switch number as a key for the BSA lookup operation. The BASE ID can be a Base Station ID, e.g., a unique number within a cellular system that identifies each cell site. The PN-OFFSET can be a unique number identifying a sector within a base station that operates according to a CDMA-based access technology standard.

Although there are also proprietary solutions that do not completely fit the above categorizations, such solutions often have features similar to one or more of the foregoing categories. Thus, available location detection implementation currently include control-plane, trusted user plane, non-trusted user plane, and proprietary solutions. In view of this wide variety of location detection implementations, the likelihood of a user device needing to operate within more than one implementation is substantial. For example, location detection while roaming is an issue in such a heterogeneous implementation. No inter-working solution exists, and as a result, current roaming solutions simply assume, often incorrectly, that the visited and home networks offer similar location detection solutions.

BRIEF SUMMARY OF THE INVENTION

Embodiments of the invention provide an inter-working location gateway (IWLG) that allows a trusted/non-trusted user plane mobile node to successfully utilize user location services while data roaming. In an embodiment, once the mobile node establishes a data connection while roaming, the mobile node uses IP connectivity to exchange messages, e.g., IS-801 messages, with an IWLG located in the home network. Via the messaging, the mobile node provides the following parameters: SID, NID, BASEID and PN-OFFSET to the IWLG as part of IS-801 messaging.

Generally, data roaming partners of the home network will fall in one of the following categories: BSA sharing data partners (operators with proprietary, control-plane implementation or no-LBS implementation); partners with trusted user plane implementations; and partners with non-trusted user plane implementations. The IWLG uses the received SID and NID parameters to determine which network the mobile node is roaming. In particular, the IWLG uses a lookup table, using the SID and NID parameters as keys, to determine the capabilities of the visited network. Based on the information, the IWLG interfaces with the appropriate network elements in the visited network to determine the location of the mobile node.

Applicable scenarios wherein the IWLG is beneficial include situations wherein a trusted mobile node is roaming in a non-trusted network. In this situation, the mobile node acquires data access using normal channels within the visited network. When location resolution is needed, an LBS application resolves the home IWLG of the home network and initiates location determination using IS-801 messages. Based on an SID and NID pair sent to the IWLG from the mobile node in an IS-801 message, the IWLG determines that the visited network supports a non-trusted user plane network. The IWLG then initiates an MPC-MPC interaction to acquire the visited PDE's address. The IWLG then initiates a PDE-PDE interaction to determine the location of the mobile node.

Another applicable usage scenario entails a non-trusted mobile node roaming in a trusted network. In this situation, the mobile node again acquires data access using normal methods at the visited network, and again, the LBS application resolves the home IWLG and initiates location determination using IS-801 messages, and the IWLG authenticates the user. Based on the SID/NID pair, the IWLG determines that the visited network supports a trusted user plane network, and the IWLG retrieves the PDE address from the lookup table and initiates a PDE-PDE interaction to determine the location of the Mobile Node.

Another applicable usage scenario for the IWLG entails a trusted or non-trusted mobile node roaming in a proprietary or control plane or non-LBS network. In this situation again, the mobile node acquires data access using normal methods at the visited network. The LBS application then resolves the home IWLG and initiates location determination using IS-801 messages. At this point, based on the device SID/NID pair conveyed in an IS-801 message, the IWLG determines the visited network's identity and uses the appropriate BSA to determine the location of the Mobile Node. In an embodiment of the invention, the visited network optionally shares its BSAs through a third party.

Additional and alternative aspects and advantages of the invention will become apparent to those of skill in the art upon reading the following detailed description of examples of the invention in conjunction with the Figures.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The following examples further illustrate certain embodiments of the invention but are intended to be illustrative rather than limiting, and as such the appended claims should not be construed as being limited in any way to the disclosed examples.

Figure 1:
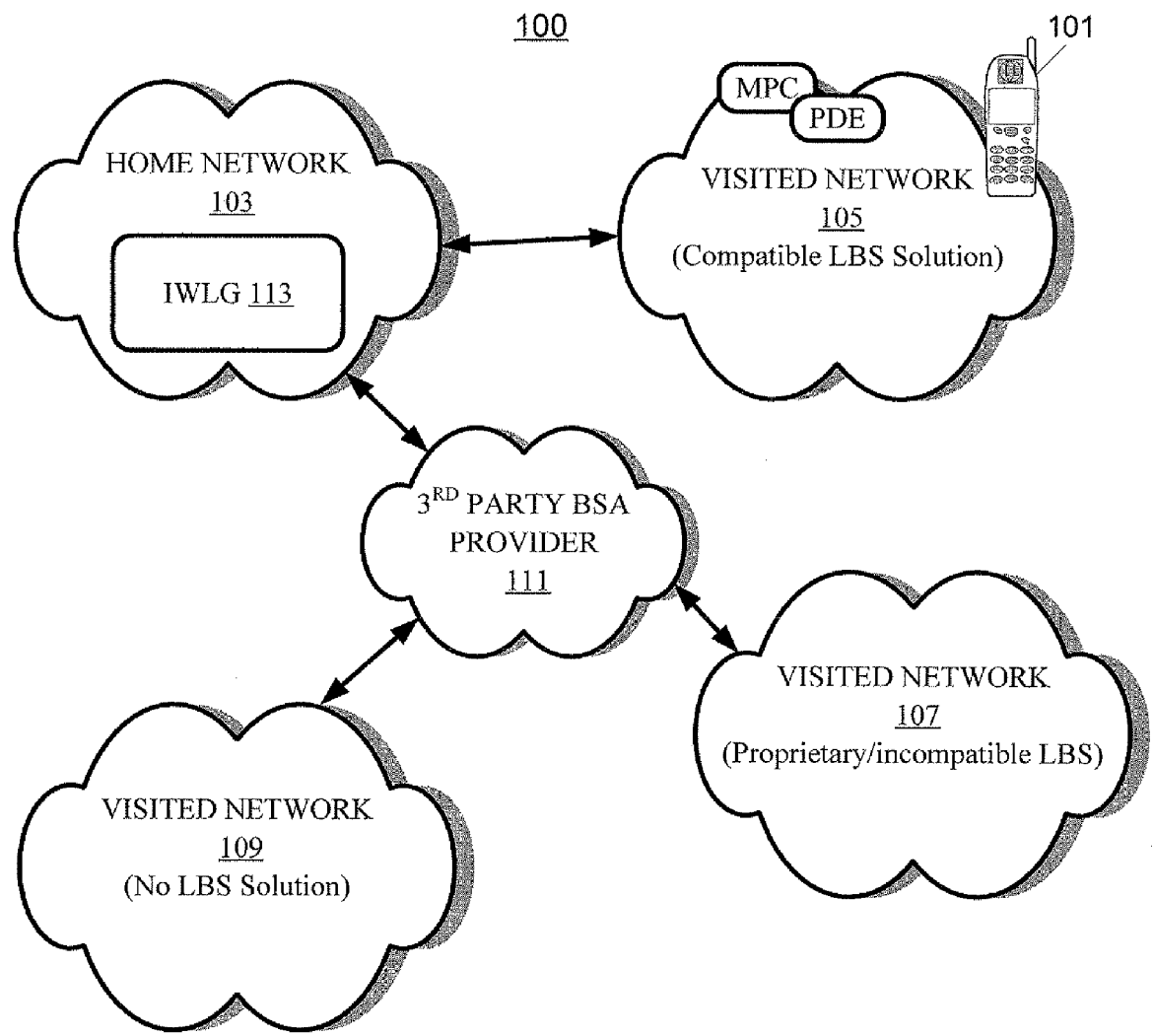
FIG. 1 is a schematic diagram illustrating an IP multimedia network environment, wherein a mobile device communicates with an application server located in an IMS core network via one or more heterogeneous access networks, as contemplated by an embodiment of the present invention.

Turning to FIG. 1, this figure illustrates schematically a wireless environment in which embodiments of the invention may be used. The exemplary network environment 100 includes a wirelessly communicating mobile device 101 that may be associated with a user and/or a vehicle, and that is sized and configured so as to be movable from one geographic location to another. Although the illustrated device 101 is a cellular phone, other mobile devices are usable within the invention as well. Examples of other devices include but are not limited to networked or networkable laptop and notebook computers, vehicle telematics units, personal digital assistants, and so on.

The network environment 100 further comprises a home network 103, and visited networks 105, 107, 109. Visited network 105 supports a compatible LBS solution. i.e., a solution that is compatible with the home network. Visited network 107 supports a proprietary or otherwise incompatible LBS solution, i.e., a solution that is incompatible with the home network. Finally, visited network 109 does not support any LBS solution. The network environment 100 further comprises a third party BSA lookup provider(s) 111 to provide an initial location determination. The home network 103 further comprises an IWLG 113.

Figure 2:
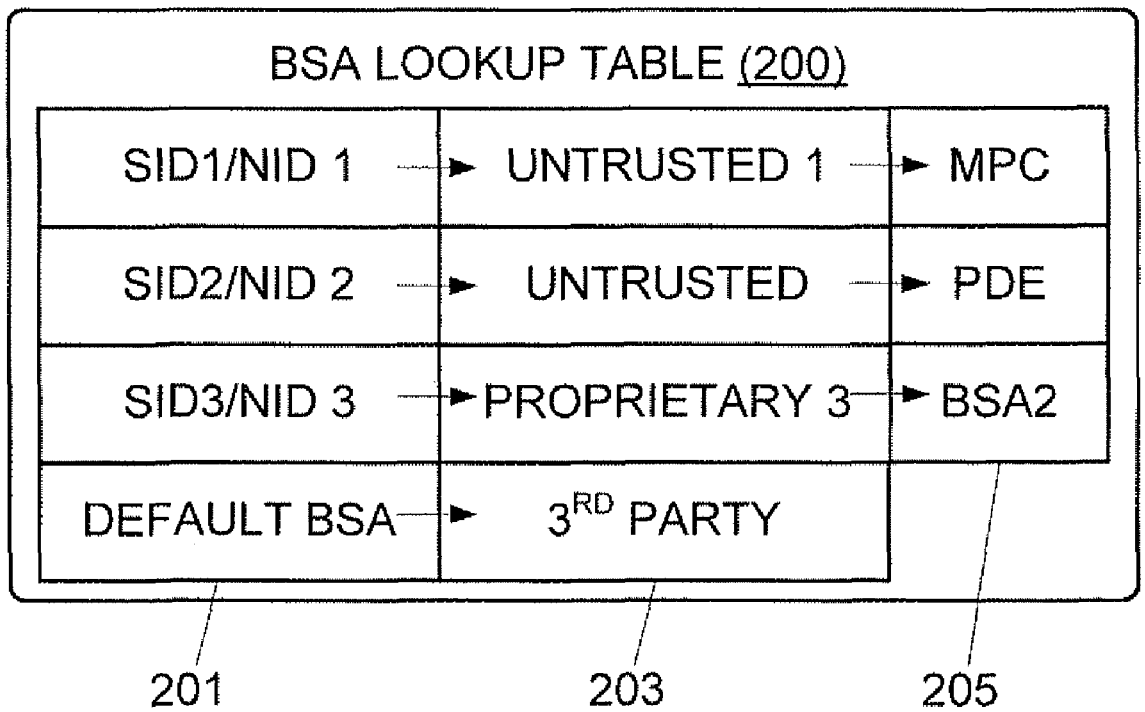
FIG. 2 is a data structure diagram showing an example of relationships stored and provided by BSA resources usable within embodiments of the invention.

The BSA provider 111 (and any other BSA source) is a resource that identifies the network of the mobile device 101. An example of the relationships stored and provided by BSA resources such as third party BSA provider 111 is illustrated in FIG. 2. The data structure 200 is a tabular structure containing fields for device information 201, network resolution 203, and network LBS ID 205. The BSA table 200 thus allows the IWLG to identify a visited network used by the mobile device given an SID/NID pair from the device.

Before discussing in detail the interrelationships and functions of the devices of network environment 100, a brief overview of the system function will be provided to guide the subsequent discussion. The mobile device 101 transmits its SID and NID among other parameters to the IWLG 113. The IWLG 113 then uses the received SID/NID pair to determine which network the mobile node is roaming. In particular, the IWLG 113 uses the BSA data 200 with the SID/NID pair as a key, to determine the capabilities of the visited network, e.g., network 105. Based on the information, the IWLG 113 interfaces with the appropriate network elements in the visited network to determine the location of the mobile node 101.

Figure 3:
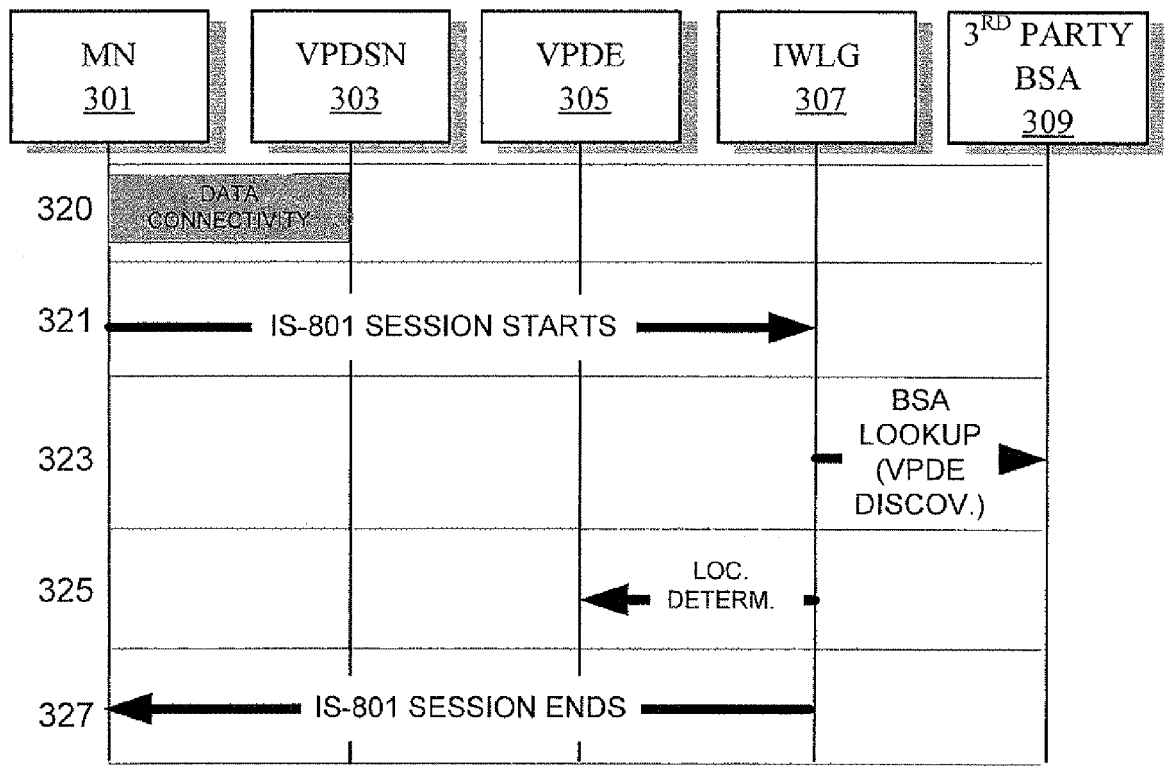
FIG. 3 is a communications graph illustrating high level messages and communications involved in device location resolution in an embodiment of the invention.

The communication graph of FIG. 3 illustrates the high level messages and communications involved in device location resolution in an embodiment of the invention. Initially at communication 320, the mobile device 301 is provided general data connectivity service by the VPDSN 303 in the ordinary manner as will be appreciated by those of skill in the art. At communication 321, location resolution begins. In particular, the device 301 opens an IS-801 messaging session with the IWLG 307.

At communication 323, the IWLG 307 discovers the VPDE 305 of the visited network via a call to a third party BSA resource 309. In particular, the IWLG 307 sends the SID/NID pair of the device 301 to the BSA resource 309 and receives the VPDE identity in return. At communication 325, the IWLG 307 uses the VPDE identity to contact the VPDE 305 and determine the location of the device 301. In particular, in an embodiment of the invention, the IWLG 307 opens a PDE-PDE interaction with the VPDE, and retrieves the device location.

Figure 4:
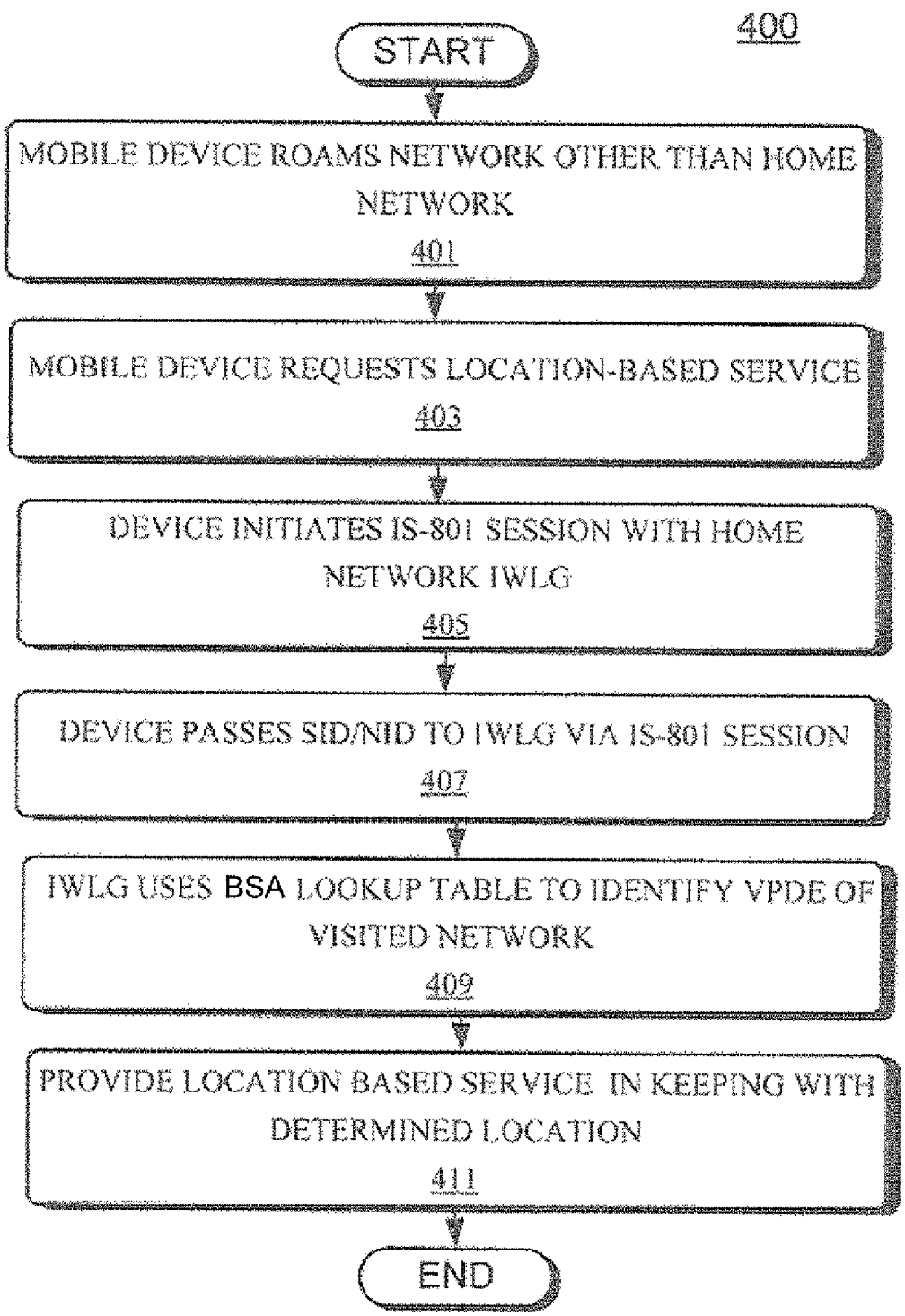
FIG. 4 is a flow chart illustrating an exemplary process of device location discovery according to an embodiment of the invention.

An exemplary process of device location discovery according to an embodiment of the invention is shown in greater detail via the flow chart of FIG. 4. At stage 401 of the process 400, a mobile device roams on a network different than its home network. At stage 403, the mobile device requests a location-based service. In an alternative embodiment of the invention, the provision of the location based service is initiated by the network rather than by the device. For example, the home network may periodically push a weather report or traffic report to the device.

The device initiates a messaging session such as an IS-801 session with an internetworking location gateway of the home network at stage 405 of the process 400. At stage 407, the device passes a number of parameters to the IWLG via the IS-801 session. For example, the transmitted parameters include the SID and NID of the network which the device is visiting at the time. The IWLG uses these parameters to determine the location of the device. In particular, at stage 409, the IWLG utilizes a BSA lookup table to identify the VPDE of the visited network. Once the VPDE has been identified, the IWLG initiates a PDE-PDE interaction to determine the location of the device. Finally, at stage 411, the location based service is provided (or denied) in a manner consistent with the determined location. For example certain services (weather reports, traffic updates, etc.) may be specifically tailored based on the identified location, whereas other services (PTT, SMS-Email, etc.) may have to be denied based on the location.

The methods described herein are especially though not exclusively adapted for internetworking among heterogeneous networks. For example, the invention provides a special benefit for location identification when a trusted mobile node is roaming in a non-trusted network, when a non-trusted mobile node is roaming in a trusted network, and when a trusted or non-trusted mobile node roaming in a proprietary or control plane or non-LBS network.

It will be appreciated that a new and useful system of mobile device location determination has been described herein. Although the disclosure has referenced specific examples, it will be appreciated that the invention is limited only by the appended claims and not by the specific examples herein. No language in the specification should be construed as indicating any non-claimed element as essential to the practice of the invention. Moreover, please appreciate that any language of disparagement or distinction is intended to connote a lack of preference for the feature under discussion, and is not intended, and should not be taken, to exclude that feature entirely from the scope of the invention unless otherwise expressly indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for detecting a location of a wireless mobile device, wherein the wireless mobile device is associated with a home network and is roaming on a network different than its home network, the method comprising:
the wireless mobile device requesting a location-based service via a data connection with the roaming network by initiating a location determination messaging session with an inter-working location gateway within the home network, the home network's implementation of location based services being heterogeneous with location determination via the roaming network;
passing a plurality of parameters from the wireless mobile device to the inter-working location gateway via the location determination messaging session, the inter-working location gateway procuring access to a Base Station Almanac (BSA) of the roaming network from a shared BSA resource;
the inter-working location gateway determining the roaming network's location based services capabilities based on the roaming network's shared BSA and the plurality of parameters; and
receiving the location based service at the wireless mobile device in accordance with a location determination by the inter-working location gateway, the location determination by the inter-working location gateway based on the determination of the roaming network's location based services capabilities.

2. The method according to claim 1, wherein the inter-working location gateway uses the plurality of parameters to determine the location of the wireless mobile device.

3. The method according to claim 2, wherein the plurality of parameters comprise an SID and NID of the network on which the wireless mobile device is roaming.

4. The method according to claim 1, wherein the messaging session comprises an IS-801 session.

5. The method according to claim 1, wherein the step of initiating a messaging session is performed by the inter-working location gateway.

6. The method according to claim 1, wherein the step of initiating a messaging session is performed by the wireless mobile device.

7. The method according to claim 1, further comprising the steps of:
utilizing a BSA lookup table by the inter-working location gateway to identify a VPDE of the network on which the wireless mobile device is roaming; and
initiating a PDE-PDE interaction from the inter-working location gateway to the identified VPDE to determine the location of the wireless mobile device.

8. The method according to claim 1, wherein the location based service comprises one or more services selected from the group consisting of a weather report, a traffic update, PTT service, and SMS-Email.

9. The method according to claim 1, wherein receiving the location based service at the wireless mobile device in accordance with a location determination by the inter-working location gateway comprises receiving a version of the service tailored to the location of the wireless mobile device.

10. The method according to claim 1, wherein receiving the location based service at the wireless mobile device in accordance with a location determination by the inter-working location gateway comprises receiving a denial of the service based on the location of the wireless mobile device.

11. The method according to claim 1 wherein the roaming network does not employ location based services.

12. A non-transitory computer-readable medium having thereon computer-executable instructions for detecting a location of a wireless mobile device, wherein the wireless mobile device is associated with a home network and is roaming on a network different than its home network, the instructions comprising instructions for:
the wireless mobile device requesting a location-based service via a data connection with the roaming network by initiating a location determination messaging session with an inter-working location gateway within the home network, the home network's implementation of location based services being heterogeneous with location determination via the roaming network;

passing a plurality of parameters from the wireless mobile device to the inter-working location gateway via the location determination messaging session, the inter-working location gateway procuring access to a Base Station Almanac (BSA) of the roaming network from a shared BSA resource;

the inter-working location gateway determining the roaming network's location based services capabilities based on the roaming network's shared BSA and the plurality of parameters; and receiving the location based service at the wireless mobile device in accordance with a location determination by the inter-working location gateway, the location determination by the inter-working location gateway based on the determination of the roaming network's location based services capabilities.

13. The computer-readable medium according to claim 12, wherein the inter-working location gateway uses the plurality of parameters to determine the location of the wireless mobile device.

14. The computer-readable medium according to claim 13, wherein the plurality of parameters comprise an SID and NID of the network on which the wireless mobile device is roaming.

15. The computer-readable medium according to claim 12, wherein the messaging session comprises an IS-801 session.

16. The computer-readable medium according to claim 12, wherein the instructions for initiating a messaging session are executed by the inter-working location gateway.

17. The computer-readable medium according to claim 12, wherein the instructions for initiating a messaging session are executed by the wireless mobile device.

18. The computer-readable medium according to claim 12, further comprising instructions for:

utilizing a BSA lookup table by the inter-working location gateway to identify a VPDE of the network on which the wireless mobile device is roaming; and initiating a PDE-PDE interaction from the inter-working location gateway to the identified VPDE to determine the location of the wireless mobile device.

19. The computer-readable medium according to claim 12, wherein the location based service comprises one or more services selected from the group consisting of a weather report, a traffic update, PTT service, and SMS-Email.

20. The computer-readable medium according to claim 12, wherein receiving the location based service at the wireless mobile device in accordance with a location determination by the inter-working location gateway comprises receiving a version of the service tailored to the location of the wireless mobile device.

21. The computer-readable medium according to claim 12, wherein receiving the location based service at the wireless mobile device in accordance with a location determination by the inter-working location gateway comprises receiving a denial of the service based on the location of the wireless mobile device.

22. The computer-readable medium according to claim 12 wherein the roaming network does not employ location based services.

* * * * *